United States Patent [19]

Yagi et al.

[11] 3,913,144

[45] Oct. 14, 1975

[54] MOVABLE TAPE GUIDE MECHANISM

[75] Inventors: Motoi Yagi, Zushi; Morio Akino, Fujisawa; Hisaharu Takeuchi, Kawasaki, all of Japan

[73] Assignee: Tokyo Shibaura Electric Co., Ltd., Kawasaki, Japan

[22] Filed: Apr. 24, 1974

[21] Appl. No.: 463,507

[30] Foreign Application Priority Data

Apr. 30, 1973 Japan ................................ 48-48148

[52] U.S. Cl. ..................... 360/130; 226/90; 360/93; 360/132

[51] Int. Cl.$^{2}$ ................ G11B 15/66; G11B 15/24; G11B 23/04

[58] Field of Search ........... 360/130, 90, 93, 95, 96; 226/90, 186, 195

[56] References Cited

UNITED STATES PATENTS

| | | | |
|---|---|---|---|
| 2,913,192 | 11/1959 | Mullin | 226/186 |
| 3,093,284 | 6/1963 | Mullin | 226/186 |
| 3,391,399 | 7/1968 | Pendleton | 360/130 |
| 3,460,782 | 8/1969 | Findeisen | 360/130 |
| 3,623,644 | 11/1971 | Olsen | 360/130 |

*Primary Examiner*—Bernard Konick
*Assistant Examiner*—R. S. Tupper
*Attorney, Agent, or Firm*—Oblon, Fisher, Spivak, McClelland & Maier

[57] ABSTRACT

A cassette tape travelling device has a scanning head and a guide mechanism. The guide mechanism is selectively rotated into a tape inserting position in which a wider tape passage is provided between the guide mechanism and the scanning head and into a tape scanning position in which a narrower tape passage is provided between the guide mechanism and the scanning head to permit the tape to be scanned by the scanning head while guided along the guide mechanism.

9 Claims, 4 Drawing Figures

MOVABLE TAPE GUIDE MECHANISM

This invention relates to a cassette tape travelling device into which a cassette tape is loaded to be run.

A video tape recorder (VTR) is generally used as a device for recording and reproducing video signals such as TV signals. The video tape recorder of a rotary head used to record and reproduce signals requires a servo mechanism for tracking, and a head rotating mechanism and a tape travelling mechanism which are complicated in design. This provides a bar to the simplification and miniaturization of the video tape recorder, resulting in an extremely high cost.

To meet the requirements of the simplification and miniaturization there has been considered a device for recording and reproducing video signals using an endless tape and a stationary magnetic head. In this device the tape is required to be stably transported at a high rate of speed of more than 3 m per second. A tape travelling mechanism used in this case is different from a low-speed tape travelling mechanism for an acoustic signal recording and reproducing device and thus is constructed, for example, as will be set out below. An endless tape wound around a reel is delivered from the innermost periphery of a tape roll, passed between a capstan and an inlet pinch roll and between the capstan and an outlet pinch roll, and would around the outermost periphery of the tape roll. The tape passed between the capstan and the inlet pinch roll is scanned by a stationary magnetic head, while guided along a guide disposed opposite to the magnetic head. Where the tape is embodied in a cassette form, it is structurally impossible in the above-mentioned tape travelling device to provide the pinch roll on the cassette, unlike a tape travelling device for acoustic signals. For this reason, it is required that, when the cassette tape is loaded onto a tape travelling device, part of the tape be delivered outward for insertion into the tape passage of the tape travelling device. With the device of this type, however, that tape passage defined between the magnetic head and the guide is designed to be made extremely narrow to permit the tape to be uniformly contacted with the magnetic head. As a result, the operation of inserting the tape into the tape passage is very time-consuming and lots of time and labor are required in loading the cassette tape onto the tape travelling device.

It is accordingly the object of this invention to provide a cassette tape travelling device onto which a cassette tape is readily loaded by a simple operation to permit the tape to be travelled in a good condition.

The cassette tape travelling device according to this invention exhibits a prominent advantage when used in combination with a cassette tape for recording and reproducing video signals in particular.

According to this invention there is provided a cassette tape travelling device onto which a cassette tape provided with a tape wound around a reel is received with its portion to be delivered, comprising a scanning head; and a guide mechanism oppositely facing the scanning head to define a tape passage therebetween into which the delivered tape portion is inserted; said guide mechanism having a pair of guides rotatably mounted in proximity to the scanning head; said guides selectively rotated, between a first position in which said guides are away from the scanning head to allow the tape passage to be wide and a second position in which said guides are near to the scanning head to permit the tape passage to be narrow, whereby upon the tape insertion the guides are brought in a first position and upon the tape travelling the guides are in a second position.

This invention can be more fully understood from the following detailed description when taken in cojunction with the accompanying drawings, in which.

Figure 1:
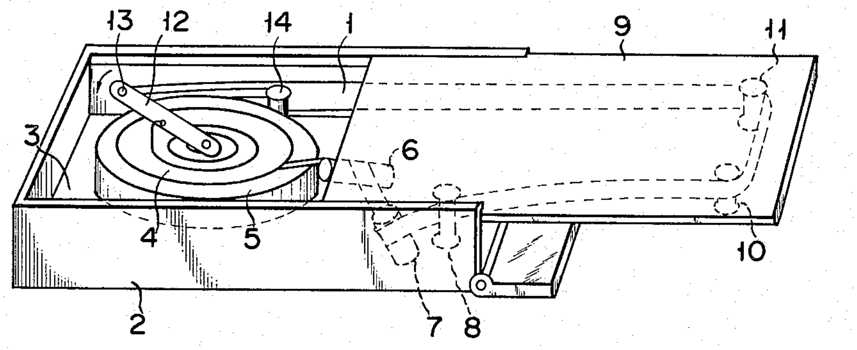
FIG. 1 is a perspective view showing a cassette tape used in combination with a cassette tape travelling device according to the embodiment of this invention.

There will now be explained the cassette tape travelling device according to the embodiment of this invention with reference to the accompanying drawings. The cassette tape travelling device, onto which a cassette tape is loaded, is incorporated in, for example, a video signal recording and reproducing device. The cassette tape is shown in FIG. 1 by way of example, but it is not restricted thereto. With the cassette tape shown in FIG. 1 an endless magnetic tape 1 is used. In place of the magnetic tape, use may be made of other recording tapes or tapes of open reel type. The endless magnetic tape 1 is housed in a case or cassette 2 with its roll 5 wound around a reel 4 rotatably mounted on a base plate 3 of the case 2. Upon travel of the tape roll 5 is rotated together with the reel 4 and the tape is delivered from the innermost periphery of the tape roll 5 and wound around the outermost periphery of the tape roll 5 and wound around the outermost periphery of the tape roll 5 after a predetermined travel. The tape roll 5 is prevented from being excessively expanded outward under a centrifugal force, by frictional engagement of the lower end of the tape roll 5 with a restricting mechanism, not shown, mounted on the base plate 3.

The tape 1 delivered from the innermost periphery of the tape roll 5 is guided, through first and second guide poles 6 and 7 mounted in an inclined manner relative to the base plate 3, with its lower edge run parallel to the base plate 3. The tape passed through the second guide pole 7 is oriented vertically to the base plate 3 and guided toward a third guide pole 8 for regulating any vibration of the tape across its width. The tape passed through the guide pole 8 is then guided toward a pair of vertical tape delivery poles 10, 11 which are suspended, at a predetermined distance apart, from the front end of an upper covering 9 of the cassette. The upper covering 9 is slidably mounted to cover an upper opening of the cassette 2 so that the cassette can be opened and closed. When the upper covering 9 is withdrawn somewhat from the case 2, that portion of the tape which is to be located relative to a magnetic head to be later described is delivered through the pair of tape delivery poles 10, 11 from the tape roll 5. The tape passed through the pole 11 is wound around the outermost periphery of the tape roll 5 through a roller or a pole 13 mounted at the free end portion of a swingable arm 12 and then past a guide pole 14 secured to the base plate 3. The arm 12 has a base end portion supported on a fixed shaft by which the reel 4 is rotatably supported. A swinging force is always imparted, by urging means such as a spring, motor etc. — in this embodiment, by a spiral spring —, to the arm 12 in a direction indicated by the arrow in FIG. 1, so that the tape portion between the roller 13 and the guide pole 14 is always kept tensioned except during the tape travel. Where the tape tends to be slackened, the arm 12 upon the loading or removing of the cassette tape imparts a tension force to the tape, thereby preventing an unnecessary contact with the case 2 due to the sagging of the tape delivery portion. The arm 12 is swung clockwise toward the front of the cassette 2 and toward the guide pole 14 and is kept in the resultant position so as not to influence to the travelling period of the tape during a tape travelling.

Figure 2:
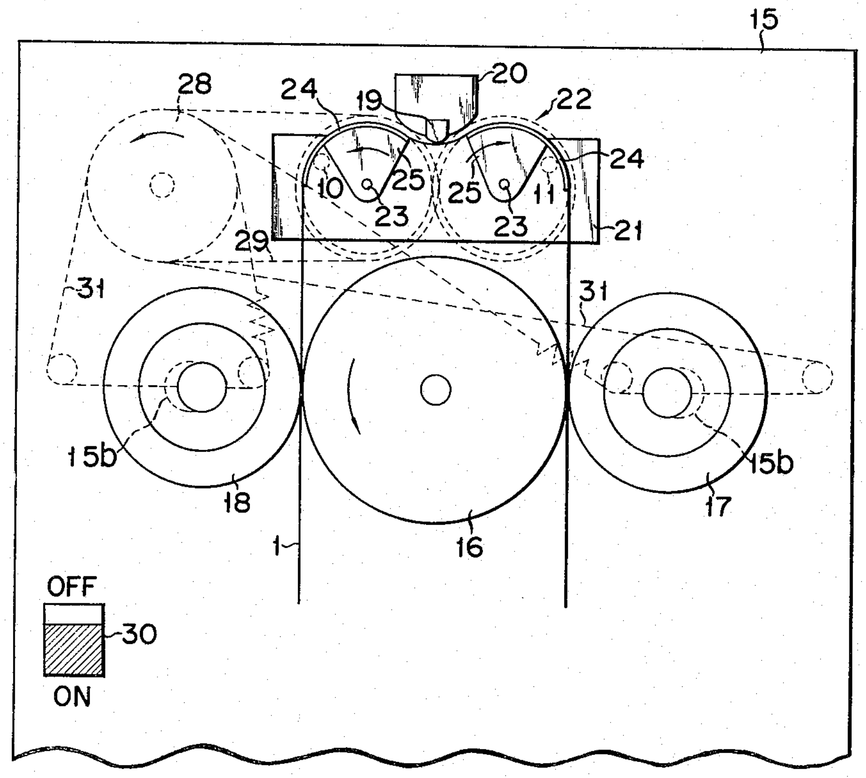
FIG. 2 is a plan view showing one aspect of the cassette tape travelling device according to the embodiment of this invention.
Figure 3:
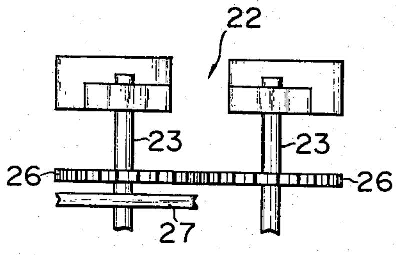
FIG. 3 is a side view showing a pair of guide members used in the cassette tape travelling device of FIG. 2.
Figure 4:
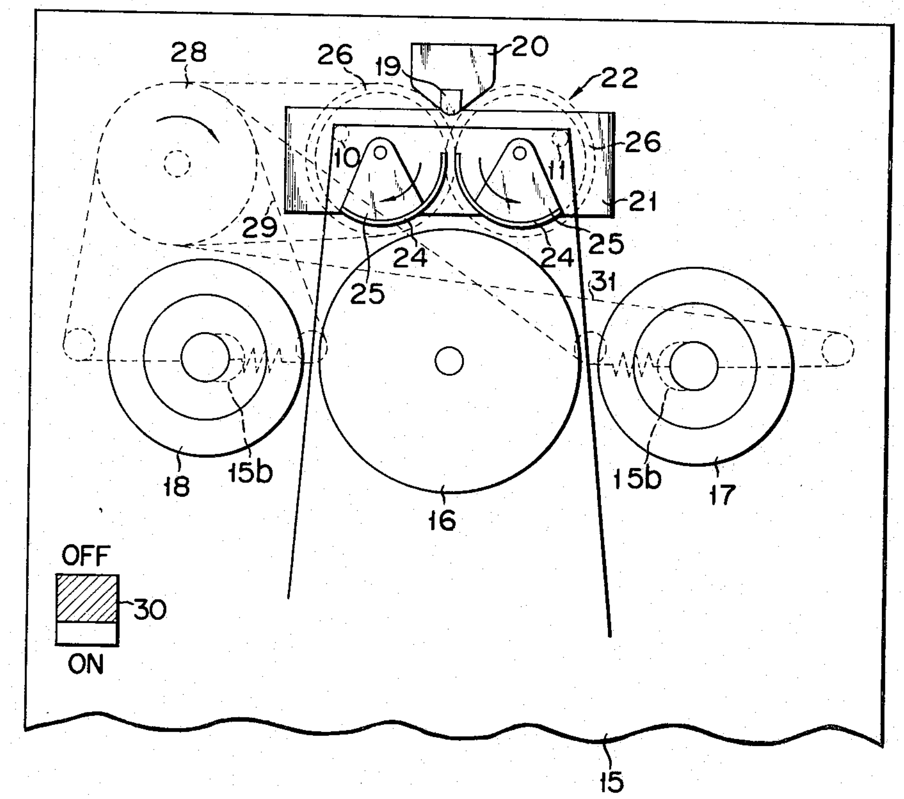
FIG. 4 is a plan view of the cassette tape travelling device shown in FIG. 2 but representing a different operating condition from that of FIG. 2.

A cassette tape travelling device shown in FIGS. 2 to 4 is suitable for running the above-mentioned cassette tape loaded therein. On a substrate 15 are provided a capstan 16 adapted to be rotated, in a direction of an arrow in FIG. 2, by a motor (not shown), and inlet and outlet pinch rolls 17 and 18 situated at opposite sides of the capstan 16. These pinch rolls 17 and 18 have their surface layers made of rubber. During a tape travelling period, the pinch rolls, in association with the capstan, permit the tape to be brought into a scanning position. When the tape is loaded, the pinch rolls 17, 18 are located away from the capstan 16 so that the tape can be easily inserted between the capstan and the pinch rolls. With this embodiment, elongated holes 15*b* are provided in the substrate 15 and the respective shafts of the pinch rolls are inserted into the respective elongated holes so that the pinch rolls can be moved along the elongated holes.

At the front portion of the substrate 15 a stationary megnetic head 19 is located opposite to, and at a predetermined interval from, the capstan 16. The magnetic head 19 is mounted on a head base 20. The magnetic head 19 and head base 20 are integrally movable vertically, i.e. across the width of the tape, relative to the substrate 15 by a suitable drive mechanism not shown. On the substrate between the magnetic head and the capstan is provided a tape supporting plate 21 for supporting the lower side edge of the tape. A guide device 22 is rotationally mounted on the supporting plate 21. In the first rotational position of the guide device a wide tape passage is provided between the magnetic head and the guide device 22 so that the delivered tape portion can be readily inserted into the cassette tape travelling device and in the second rotational position of the guide device 22 a narrower tape passage is provided so that the magnetic head 19 can normally scan the magnetic tape. The guide device 22 has a pair of rotatable support shafts 23 extending upward through the substrate 15. A pair of rotational bodies 25 are mounted to the respective projecting ends of the support shafts 23. The rotational bodies 25 have respective arcuate guide plates 24 mounted on their peripheries. The rotational body is substantially arcuately sectional in configuration and has the support shaft 23 near its central axis. The guide plates 24, when in the second or scanning position, are moved closest to the head base 20 as shown in FIG. 2 to permit the magnetic head 19 to scan the magnetic tape slidably travelling along the guide plates 24. When the support shafts 23 and thus the rotational bodies 25 are rotated through about 180° into the first or tape inserting position, the rotational bodies 25 and thus the guide plates 24 are moved furthest away from the head base 20 so that the wide tape passage is defined, as shown in FIG. 4, between the guide plate 24 and the magnetic head 19. This permits the magnetic tape to be easily inserted between the magnetic head 19 and the poles 10, 11. The pair of guide plates 24 may be manually rotated. With this embodiment, however, the pair of guide plates 24 are electrically rotated, as shown below, in synchronism with the movement of the pinch rolls 17, 18. Below the substrate 15 a pair of intermeshing gears 26 are individually coaxially mounted on the support shafts 23. A driven pulley 27 is further mounted to one of the support shafts 23. The driven pulley 27 is operatively connected through a rope 29 to a driving pulley 28 which is driven by a motor. The driving of this motor is controlled by a switch 30 mounted below the base substrate 15. The driving pulley 28 is operatively connected by a rope and spring assembly 31 to the pair of pinch rolls 17, 18 to permit the pinch rolls 17, 18 to be selectively located into the tape travelling and tape inserting positions in synchronism with the movement of the guide device 22.

There will now be explained the operation of the above-mentioned cassette tape travelling device into which the cassette tape of FIG. 1 is incorporated.

When the motor is energized through the switch 30, the guide device 22 and pinch rolls 17, 18 are brought into the tape inserting position in which the wide tape passage is provided. Then, the upper covering 9 is withdrawn from the case 2 as shown in FIG. 1 to cause the tape to be delivered outward through the pair of guide poles 10, 11 as shown in broken lines in FIG. 1. That tape delivery portion defined between the pair of poles 10 and 11 is inserted between the magnetic head 19 and the guide device 22 with the remaining tape delivery portion located between the capstan 16 and the pinch rolls 17, 18. In this state the case 2 is fixed by a suitable mechanism, not shown, to the device. Upon energization of the switch 30 the motor is driven to cause the guide plates 24 to the guide device 22 to be rotated through about 180° to permit the tape to be located relative to the magnetic head 19. In synchronism therewith, the pair of pinch rolls 17, 18 are moved along the respective elongated holes 15*b* into contact with the capstan 16. When the capstan 16 is rotated, the tape 1 is delivered from the innermost periphery of the tape roll 5, then passed through the poles 7, 8 and the nip between the capstan 16 and the inlet pinch roll 17, through the narrow passage between the magnetic head and the guide plate, and then through the nip between the capstan 16 and the outlet pinch roll 18, and wound around the outermost periphery of the tape roll 5.

According to this device the cassette tape can be easily loaded, since the narrow passage defined between the magnetic head and the guide device can be made wider during the tape inserting time. Furthermore, the arcuate configuration of the pair of guide plates 24 permits the tape to be efficiently guided. Consequently, the guide plate can be made in compact form. Since the pinch rolls 17, 18 are moved toward and away from the capstan in synchronism with the movement of the guide plate, the tape can be easily inserted between the capstan and the pinch roll.

Though, with the above-mentioned embodiment, explanation is restricted only to the magnetic tape, use may also be made of tapes recording signals in groove channels or shaded patterns. In the former case, a piezoelectric element is used in place of the magnetic head to reproduce signals from the tape, while in the latter case a photosensitive element is used in place of the magnetic head to reproduce signals from the tape.

We claim:

1. A tape cassette device onto which a tape cassette provided with a tape wound around a reel is received, comprising:

a scanning head;

a guide mechanism disposed opposite the scanning head so as to define a tape passage therebetween within which the tape is disposed, said guide mechanism having a pair arcuately configured guides positioned adjacent to and on opposite sides of the scanning head, and means mounting each guide for rotation in proximity to the scanning head; and means for selectively rotating said guides between a first position at which said guides are disposed away from the scanning head to widen the tape passage to be sufficiently wide whereby said tape may be freely inserted within said tape passage without contacting either said scanning head or said guides and a second position substantially diametrically opposite said first position to narrow the tape passage whereby said tape is forced into contact with and wrapped about said scanning head by said guides so as to insure stable travelling of said tape.

2. A tape cassette device according to claim 1 in which said scanning head is a stationary magnetic head.

3. A tape cassette device according to claim 1 in which each of the rotatable guides has a rotation shaft and a guide plate eccentrically mounted upon said shaft and having an arcuate section; the arcuate section being selectively movable toward the scanning head so as to assume the second position at which the tape is contacted with the head, and away from the scanning head into the first position so as to permit said insertion of said tape.

4. A tape cassette device according to claim 3 in which said means for selectively rotating rotates said guides in opposite directions through the same amount.

5. A tape cassette device according to claim 1, which further includes means for moving said tape past said scanning head including a pair of pinch rolls and a capstan between which the tape is travelled.

6. A tape cassette device according to claim 5 wherein:

said pinch rolls and said capstan are disposed at a location remote from said scanning head and upon the side of said guides opposite that upon which said scanning head is disposed.

7. A tape cassette device according to claim 5 and further comprising:

means for moving each of said pinch rolls to a first position spaced away from the capstan to permit insertion of said tape between said rolls and said capstan and for moving each of said pinch rolls to a second position in which the tape is sandwiched between and in contact with the capstan and the pinch rolls.

8. A tape cassette device according to claim 7, further including means for synchronously moving the pinch rolls and the guide mechanism, selectively, into said first and second positions.

9. A tape cassette device according to claim 7 wherein:

said pinch rolls and said capstan are substantially linearly aligned, said pinch rolls being disposed upon opposite sides of said capstan, whereby the nip between said capstan and one of said pinch rolls is included within an inlet feed path for said tape while the nip between said capstan and said other one of said pinch rolls is included within an outlet withdrawal path for said tape.

* * * * *